United States Patent
Shah

(10) Patent No.: US 6,269,350 B1
(45) Date of Patent: Jul. 31, 2001

(54) METHOD AND APPARATUS FOR PLACING AUTOMATED SERVICE CALLS FOR POSTAGE METER AND BASE

(75) Inventor: Chandrakant J. Shah, Stockton, CA (US)

(73) Assignee: Neopost Inc., Hayward, CA (US)

( * ) Notice: Subject to any disclaimer, the term of this patent is extended or adjusted under 35 U.S.C. 154(b) by 0 days.

(21) Appl. No.: 09/122,168

(22) Filed: Jul. 24, 1998

(51) Int. Cl.[7] .................................................. G06F 17/60
(52) U.S. Cl. .............................................. 705/410; 700/244
(58) Field of Search ..................................... 705/400, 404, 705/405, 410; 700/78, 80, 81, 82, 179, 231, 236, 244, 241, 239

(56) References Cited

U.S. PATENT DOCUMENTS

| | | | |
|---|---|---|---|
| 4,653,009 | * 3/1987 | Brown | 700/244 |
| 4,697,182 | * 9/1987 | Swanson | 340/870.02 |
| 4,742,469 | * 5/1988 | Haines et al. | 705/410 |
| 4,783,747 | * 11/1988 | Komori et al. | 700/244 |
| 4,931,963 | * 6/1990 | Kimura et al. | 702/184 |
| 5,222,027 | * 6/1993 | Williams et al. | 700/239 |
| 5,638,442 | * 6/1997 | Gargiulo et al. | 380/2 |
| 5,844,808 | * 12/1998 | Konsmo et al. | 700/244 |
| 5,963,452 | * 10/1999 | Etih et al. | 700/236 |
| 5,983,197 | * 11/1999 | Enta | 705/16 |
| 6,010,069 | * 1/2000 | Debois | 235/380 |
| 6,043,642 | * 3/2000 | Martin et al. | 324/142 |
| 6,098,032 | * 8/2000 | Brookner | 702/182 |

FOREIGN PATENT DOCUMENTS 299 14 577 1 * 12/1999 (DE) .

OTHER PUBLICATIONS no author; SPYRUS Unveils New Desktop Security for Electronic Postage Metering; Jan. 1998; Business Wire, p01120360; DialogWeb copy pages 1–3.*

* cited by examiner

Primary Examiner—James P. Trammell
Assistant Examiner—Thomas A. Dixon
(74) Attorney, Agent, or Firm—Townsend and Townsend and Crew LLP

(57) ABSTRACT

A meter and/or base coupled to one or more modems automatically places a service call to a service center upon detection of particular ones of detected faults. Diagnostic and test software periodically test the meter and/or base to ensure that the meter and/or base operate in an expected manner. Upon detection of a hard fault, a service call is placed to the service center and pertinent diagnostic data (e.g., the error code) is transmitted to allow the service center to promptly and properly respond to the call. For soft faults, the meter can resume operation if the detected fault clears up

10 Claims, 4 Drawing Sheets

METHOD AND APPARATUS FOR PLACING AUTOMATED SERVICE CALLS FOR POSTAGE METER AND BASE

BACKGROUND OF THE INVENTION

The present invention relates generally to postage metering systems, and more particularly to a method and apparatus for placing an automated service call for postage meter and base.

A postage meter allows a user to print postage or other indicia of value on envelopes or other media. The postage meter can be leased or rented from a commercial group (e.g., Neopost). Typically, the user purchases a fixed amount of value beforehand and the meter is programmed with this amount. Subsequently, the user is allowed to print postage up to the programmed amount.

Because the meter is capable of printing postage having a value, security is critical to prevent unauthorized use. The meter typically includes a print mechanism and mechanical arrangements and/or electronic control circuitry that direct the operation of the print mechanism. The print mechanism and control circuitry are usually enclosed in a secured housing that prevents tampering with the meter and unauthorized access by anyone except for authorized factory technicians. The control circuitry can contain sensors that detect tampering with the meter and flag such condition. Examples of secured postage meters are disclosed in U.S. Pat. No. 4,742,469, entitled "ELECTRONIC METER CIRCUITRY", issued May 3, 1988, and U.S. Pat. No. 4,484,307 entitled "ELECTRONIC POSTAGE METER HAVING IMPROVED SECURITY AND FAULT TOLERANCE FEATURES", issued Nov. 20, 1984, both assigned to the assignee of the present invention and incorporated herein by reference.

With the advent of electronic control circuitry, meter security is typically provided by digital signature, encryption, and other techniques. These techniques allow for electronic detection of meter tampering, e.g., attempts to modify the normal operation of the accounting registers used to store value.

The electronic control circuitry also enables the meter to perform other diagnostic functions. For example, the meter of the '469 patent is able to detect component failures within the meter and to flag such conditions.

The meter of the '469 patent has the ability to detect multiple types of failure, e.g., "hard" and "soft" faults. Hard faults include failures that threaten the security of the system and/or failure of important hardware. When such faults are detected, a fault code is written into a memory and the meter is locked to prevent further operation until it has been returned to the factory for service. An error message is then displayed on a display to warn the user of the problem and to prompt the user to make a service call to the factory or service center. The user then places the service call through a conventional telephone system.

Soft faults include conditions that pose no potential threat to the security or integrity of the meter. Soft faults can include conditions that are defined in the software as temporary or transitory in nature. For soft faults, the meter displays the error code on the display, writes the error code to memory for later diagnostics, and enters a loop in which it monitors the detected failure condition. The display can prompt the user to make a service call. If the failure condition disappears, the meter resumes operation.

The error reporting mechanism of currently available meters tends to be crude in nature. In some meter designs, the display screen is limited to a few alphanumeric characters, just enough to report the error code. The user and service technician then reference a chart that accompanies the meter to determine the type of failure based on the reported error code. In other meter designs, the meter displays an error message such as "Call Service". However, in all these designs, the user must make the necessary service call.

This reporting mechanism is inadequate for a number of reasons. First, the fault condition may not be noticed by the user in a timely manner and the reporting delay can result in loss of use to the user, and possible income to the postal service. Second, the user may be aware of the error display but may not be knowledgeable enough to initiate the service call. This is particularly true for meter designs that simply display the fault's error code. Third, to provide a higher level of service, the meter lessor has a strong interest to know when a meter has been tampered with or is non-functional so that corrective actions can be taken immediately.

SUMMARY OF THE INVENTION

The present invention provides method and apparatus for placing automated service calls for a postage meter and base. In one configuration, the meter is a stand-alone unit that couples to a modem. In another configuration, the meter couples to the base and shares a modem coupled to the base. In yet another configuration, the meter couples to the base and each unit couples to an associated modem that connects the corresponding unit to a service center. The meter can communicate with the base through a predetermined protocol. The modem connects the meter and/or the base to the service center through a wireline or wireless transmission system.

In one embodiment, the meter contains diagnostic software that periodically checks the meter to ensure that the meter is operating in an expected manner. If a hard fault is detected, the meter initiates a service call to the service center and transmits the pertinent diagnostic data (e.g., the error code) to allow the service center to promptly and properly respond to the call. For other faults, the meter can attempt automatic and/or manual reset for a predetermined number of times before declaring a hard fault.

In another embodiment, the base contains test software that periodically checks the meter to ensure proper operation of the meter. If a fault is detected, the base can attempt to reset the meter hardware. If the reset fails, the base can initiate a service call to the service center through its own modem and transmits the pertinent diagnostic data. The service call can be made in the case of a hard fault, for example.

In yet another embodiment, the base contains diagnostic software that periodically checks the base to ensure proper operation of the base. If a fault is detected, the base can prompt the operator to fix serviceable faults. Otherwise, the base initiates a service call to the service center and transmits the pertinent diagnostic data.

The detected fault can be classified into one or more fault types. For example, the fault can be classified as "hard" or "soft" fault. The meter and base then initiate actions based on the type of fault detected. For hard fault, the meter is preferably disabled from further operation until it has been serviced. For soft fault, the error condition can be monitored and the meter be allowed to resume operation if the fault disappears.

The foregoing, together with other aspects of this invention, will become more apparent when referring to the following specification, claims, and accompanying drawings.

DESCRIPTION OF THE SPECIFIC EMBODIMENTS

System Overview

A postage metering system can be designed in one of many configurations. In one configuration, a postage meter operates as a stand-alone unit and couples to a modem. The modem can communicate with one or more of the following entities: (1) a service center, (2) a central dispatch facility, (3) postal authorities, (4) the manufacturer, and the like. Hereinafter, these entities are collectively referred to as the "service center". Thus, the term service center is used to refer to any entity that may have a need or desire to know about, or an ability to act on, a problem with a postage metering system.

In another configuration, the postage meter is a secured module that couples to a mailing machine base and functions in conjunction with the base. The meter communicates with the base through a software protocol. One such protocol is disclosed in the aforementioned U.S. Pat. No. 4,484,307. In one variant of this configuration, the meter is not directly coupled to a modem and connects to the service center through a modem in the base. In a another variant, the meter and base couple to respective modems and are able to independently communicate with the service center through the respective modems. The meter and base can also operably couple to the other unit's modem, i.e., through the software protocol between the units, so that if one modem fails, the remaining modem can be used by both units. For example, if the modem coupled to the meter fails, the meter is still able to communicate with the service center through the modem coupled to the base. This cross-coupling feature provides added redundancy and increases system reliability.

As used herein, "meter" generically refers to (1) a postage meter, (2) a secured module, (3) a secure metering device (SMD), and others. An SMD is a class of computer peripherals that performs the security functions of postage metering systems. Examples of SMD are closed system secured device (CSSD) and postage secured device (PSD). Similarly, as used herein, "base" generically refers to (1) a mailing machine base, (2) a computer, and others.

Figure 1:
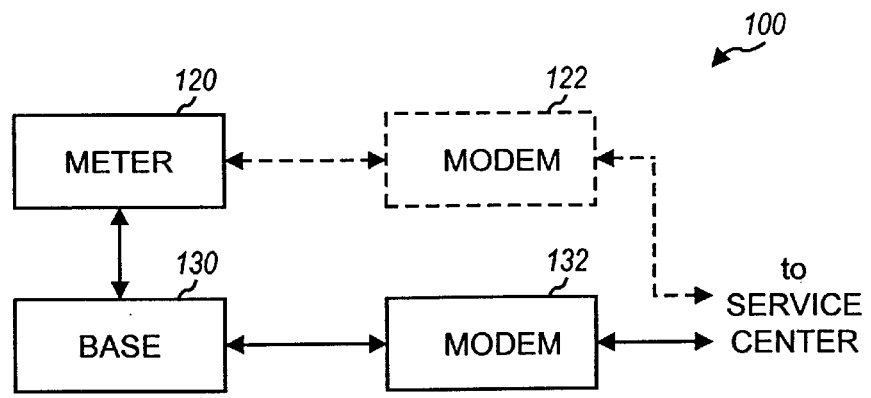
FIG. 1 is a block diagram illustrating several possible configurations of a postage metering system.

FIG. 1 is a block diagram illustrating several possible configurations of a postage metering system 100. Postage metering system 100 includes a meter 120 coupled to a base 130. Base 130 couples to a modem 132. Meter 120 can also couple to an associated modem 122. FIG. 1 illustrates some example configurations of postage meter system 100. Other configurations can be designed, as described above.

The modems can be a wireline connection, such as a telephone company connection using a standard telephone line, or a wireless connection. The modem can provide a direct connection to the service center or an indirect connection through a communication network, such as the Internet. Through the modem, the meter and the base are able to place automatic service calls to the service center.

It may be desirable to use a postage metering system, such as postage metering system 100, in a mobile environment. For example, the postage metering system may be moved from site to site by the user, and some sites may not be equipped with a wireline connection. Also, the service center may determine that it is more efficient to operate mobile service teams. For these reasons, it is advantageous to have a postage metering system that is able to communicate to the service center using a wireless link. One example of a wireless modem link is a wireless service dispatch system.

Figure 2:
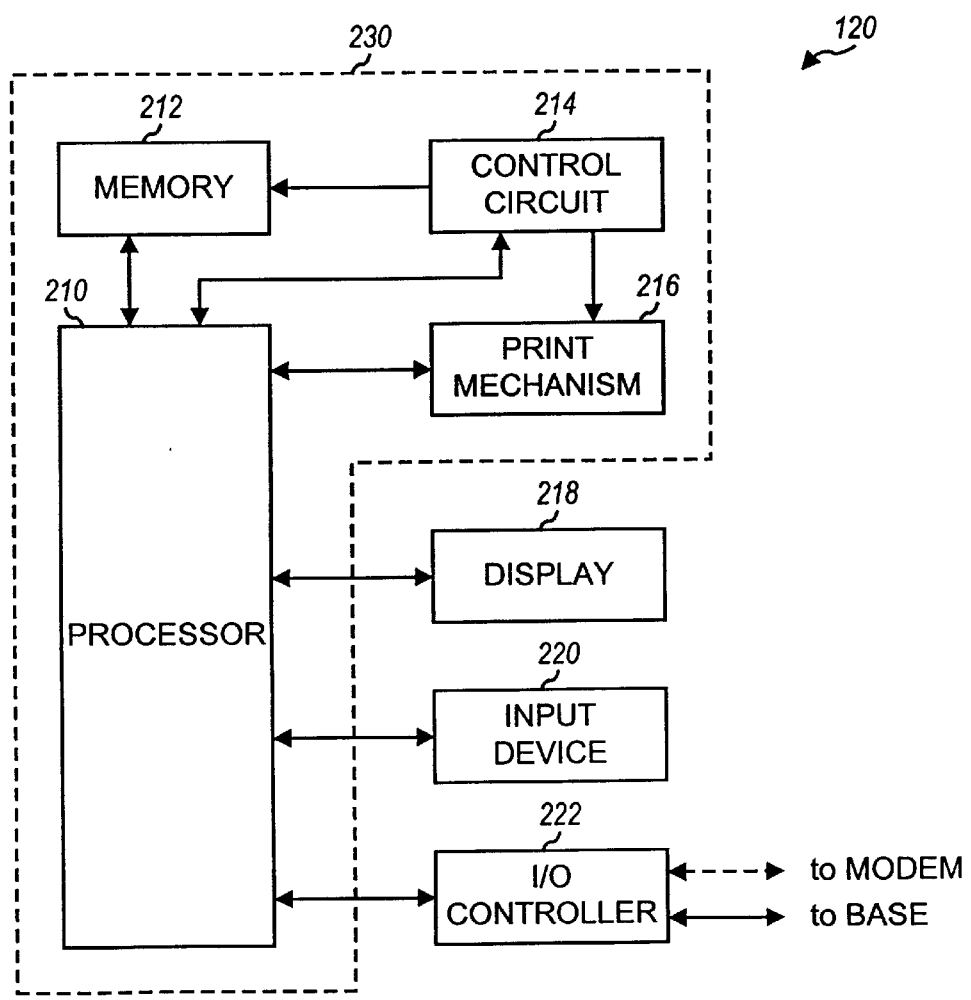
FIG. 2 is a block diagram illustrating the basic subsystems of one embodiment of the postage meter.

FIG. 2 is a block diagram illustrating the basic subsystems of one embodiment of meter 120. Meter 120 includes a processor 210, a memory 212 for storing accounting information and/or program codes, a control circuit 214, a print mechanism 216 for printing value indicia (such as postage), a display 218 for displaying messages, an input device 220 for receiving commands from a user and/or service technician, and an I/O controller 222 for interface to a base and/or a modem. Control circuit 214 receives and generates various timing and validation signals to prevent unauthorized actuation of print mechanism 216 and the unauthorized writing into accounting registers in memory 212.

Processor 210 couples to memory 212, control circuit 214, print mechanism 216, display 218, input device 220, and I/O controller 222. Control circuit 214 also couples to memory 212 and print mechanism 216. Processor 210, memory 212, control circuit 214, and print mechanism 216 can be enclosed inside a secured and tamper resistance housing 230.

Processor 210 directs the operation of meter 120 and operates according to a program stored in an associated read-only-memory (ROM) and/or random-access-memory (RAM). These memories may be physically separate integrated circuits (e.g., memory 212) or may be integrated within processor 210. Processor 210 can be a microprocessor, a microcomputer, a microcontroller, an applications specific integrated circuit, a digital signal processor, or the like. The operation of meter 120 is further described in the aforementioned U.S. Pat. No. 4,742,469.

Another example of a design of a postage meter is disclosed in U.S. Pat. No. 5,612,884 entitled "REMOTE METER OPERATION", issued Mar. 18, 1997, assigned to the assignee of the present invention and incorporated herein by reference. The meter disclosed in the '884 patent includes an input/output (I/O) port and is capable of communication with an external device, e.g. a modem. Generally, the inventive concept described herein can be applied to any meter design that supports communication with an external device.

System Operation

The operation of the postage meter is monitored periodically. Diagnostic software located within the meter and/or the test software located within the base can poll various subsystems of the meter and report any detected failure or fault. Furthermore, various sensors within the meter can also detect faults and report these conditions as they occur.

In one embodiment, the meter contains diagnostic software and performs periodic tests. When the meter detects any of a number of specified hard faults, it automatically places a service call via its own modem. This embodiment allows the meter to act as a stand-alone unit capable of detecting and reporting failure on its own. The service call can include pertinent diagnostic data such as: (1) the detected error code, (2) the model/serial number of the meter, (3) the location of the meter, (4) the time the error is detected, (5) the time (or cycles) since the last inspection, (6) license or lease status, (7) general failure classification, (8) suspect components, and others. The diagnostic data allows the service center to diagnose the failure and to promptly and properly respond to the call.

In another embodiment, the base periodically tests the meter with test software. If the test shows the meter to be installed on the base but non-functional due to a hard fault, the base initiates a service call on behalf of the meter via the base modem. Again, the base can transmit the pertinent diagnostic data, such as the detected error code, to allow the service center to properly respond to the call. This embodiment provides for an automated service call even when the meter is disabled to an extent that it cannot make the call itself. The added level of redundancy provides improved service and reliability.

In yet another embodiment, the base contains diagnostic software and performs periodic tests of its hardware. When the base identifies any one of a number of specified faults that are not serviceable by an operator, it initiates a service call through its modem. The service call can include the pertinent diagnostic data to allow the service center to properly respond.

As will be obvious to one skilled in the art, the various embodiments described above can be combined to provide the desired level of functionality. For example, the meter and the base can each contain diagnostic software for detection of its respective faults. Also, the postage metering system can embody all three of the embodiments described above such that the meter can be tested by its own diagnostic software and by the base test software, and the base can be tested by its own diagnostic software.

As described herein, the meter diagnostic software, the base test software, and the base diagnostic software are routines programmed to perform the necessary operations on the processor within the associated meter and base. The software includes routines that perform detection, diagnosis, and notification of various system errors. The errors include tampering and/or malfunctions of the hardware as well as software. The software can comprise microcode that can be stored or hardwired within the processor. Various implementations of the software can be contemplated by those skilled in the art and are within the scope of the present invention.

Faults can also be detected by sensors within the meter. One example is a cover switch that activates when the secured cover of the meter is dislodged or any electronic hardware probing is attempted. Another example is a device that detects when the accounting registers are modified without authorization. Although not shown in FIG. 2, these sensors couple to the associated subsystems to which they apply and send signals to control circuit 214 or processor 210 when activated.

Fault States

During normal operation, the processor within the meter and/or base performs various checks on the memory, the printing mechanism, and the processor itself. The detected faults can be classified into one or more types, e.g., based on the severity of the fault, so that appropriate action can be taken. In one embodiment, the faults are classified as "hard" and "soft" faults.

In one embodiment, hard faults are defined as those that threaten the security of the system and those that render the meter inoperable. Thus, hard faults include detection of (1) tampering with the secured housing, (2) attempts to set the accounting unit to an unauthorized value, (3) attempts to prevent the operation of the accounting unit during the normal print cycle, (4) failure of the sensors, (5) failure of critical components (e.g., the printing 30 mechanism, the memory, the processor), (6) erroneous accounting by the accounting unit (e.g., that is detected by an error-checking algorithm), and others.

Soft faults are defined as those that neither (1) threaten the security or integrity of the system nor (2) cause the meter to be inoperable. Soft faults can be all other detected faults that are not classified as hard. Soft faults include abnormal conditions that are believed to be transitory in nature.

The faults that are detected by the meter and base depend on the particular design of the postage meter system. An example of a postage meter design and the list of detected hard and soft faults for the meter is described in the aforementioned U.S. Pat. No. 4,742,469. The lists of hard and soft faults described therein are only used to illustrate by way of example, and are not construed as limitations of the present invention.

Meter Faults Detected by the Meter

Figure 3:
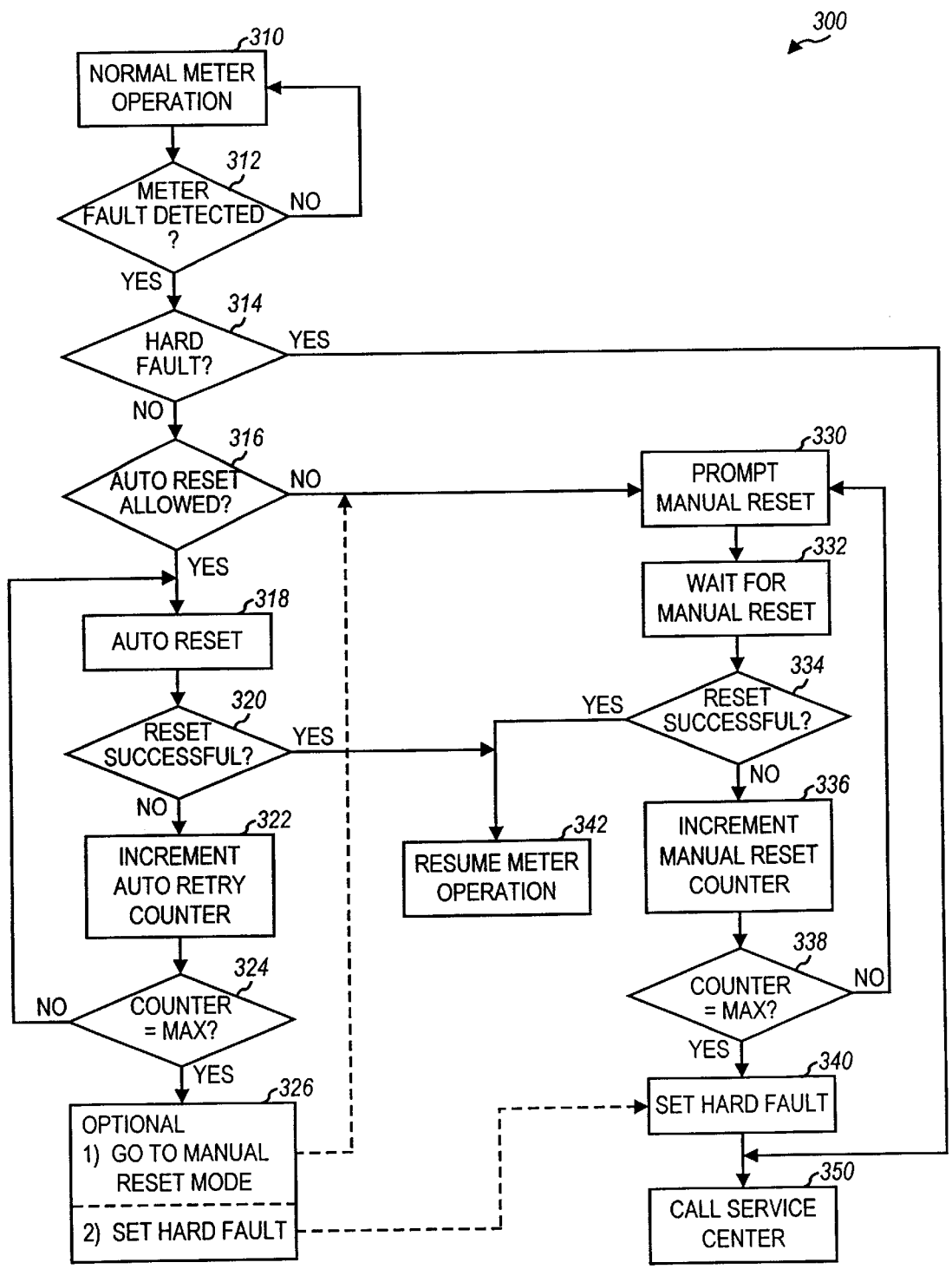
FIG. 3 is a flow diagram illustrating the detection and reporting of meter faults by the meter.

FIG. 3 shows a flow diagram 300 illustrating the operation of the diagnostic routine for detection and reporting of meter faults by the meter. At a step 310, the meter operates in the normal manner. Periodically, at a step 312, the meter determines whether a meter fault has been detected. If no meter faults are detected, the meter returns to step 310 and resumes normal operation. Otherwise, if a meter fault is detected, the meter then determines whether it is a hard fault, at a step 314. If a hard fault is detected, the meter proceeds to a step 350 where it places a service call to the service center using its modem or the base modem. The service call can include diagnostic details (e.g., the service code) that assist the service center to properly respond.

If a hard fault is not detected by the meter at step 314, the meter then determines, at a step 316, if the fault is one that allows for automatic reset. If automatic reset is allowed, the meter proceeds to a step 318 where it performs the automatic reset. The automatic reset can include any operations that the meter is allowed to retry. If the fault is not detected again after the retry, the error flag can be cleared and/or the processor can be reset (e.g., by the software) and normal operation is resumed. If the meter determines, at a step 320, that the automatic reset is successful it resumes normal operation, at a step 342. Otherwise, if the automatic reset is unsuccessful the meter increments an auto retry counter, at a step 322. At a step 324, the meter determines if the auto retry counter equals the allowable maximum number. If the answer is no, the meter returns to step 318 to perform another automatic reset. Otherwise, if the auto retry counter equals the maximum, the meter proceeds to a step 326.

Step 326 can be implemented in one of several options. In the first option, the meter proceeds to a step 330 and requests a manual reset if the automatic reset fails. One example of a manual reset is to power the meter off/on. In the second option, if automatic reset is unsuccessful, the meter treats the detected fault as a hard fault and proceeds to a step 340.

If automatic reset is not allowed for the detected fault, as determined at step 316, the meter proceeds to a step 330 where it displays a manual reset prompt, e.g., "Reset Machine", to induce a manual reset from the user. The meter then waits for the manual reset at a step 332. Upon detection of a successful reset, at a step 334, the meter resumes operation, at step 342. If the manual reset is not successful, the meter increments a manual retry counter, at a step 336. If the meter determines, at a step 338, that the manual reset counter is less than the allowable maximum number, the meter returns to step 330 and prompts for another manual reset. Otherwise, if the manual reset counter equals the maximum, the meter proceeds to step 340 where it declares the detected fault as a hard fault. The meter then proceeds to step 350 where it places an automated service call.

Meter Faults Detected by the Base

Figure 4:
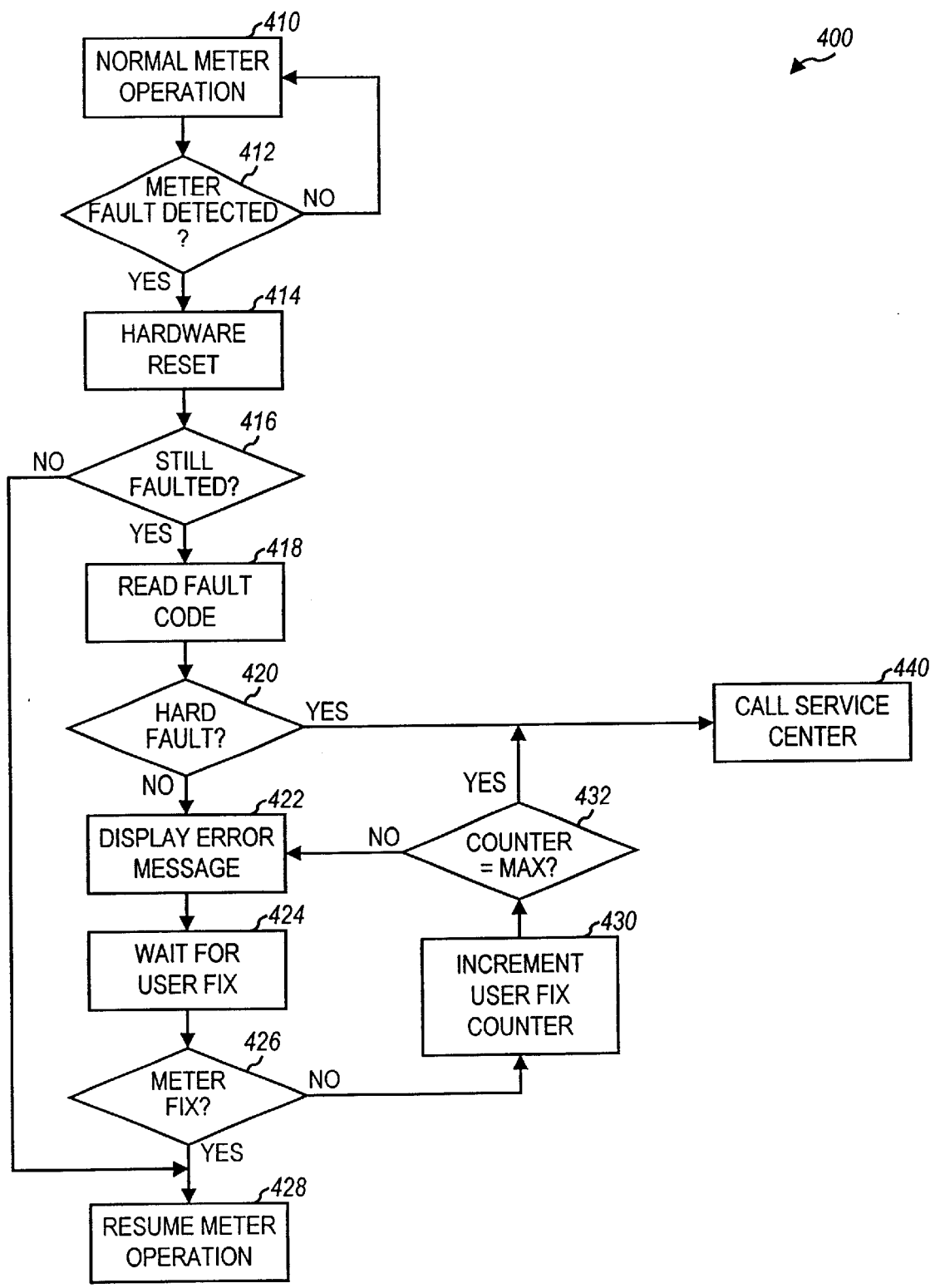
FIG. 4 is a flow diagram illustrating the detection and reporting of meter faults by the base.

FIG. 4 shows a flow diagram 400 illustrating the operation of the test routine for detection and reporting of meter fault by the base. At a step 410, the meter operates in the normal manner. At a step 412, the base determines, through its test software or through a report of the fault by the meter, whether a meter fault has been detected. If no meter faults are detected, the base returns to step 410 and wherein the meter continues to operate in the normal manner. However, if a meter fault is detected, the base performs a hardware reset of the meter or, alternatively, commands the meter to perform a reset of the meter hardware, at a step 414. One method of performing hard reset is to cycle the meter power off/on. The base then determines, at a step 416, whether the fault still exists after the hardware reset. If no faults are detected, the base proceeds to a step 428 wherein the meter resumes normal operation.

If the fault persists after the hardware reset, the base reads the fault code, at a step 418. If a hard fault is detected, at a step 420, the base proceeds to a step 440 where it places a service call using its modem. The base can report the fault code and the diagnostic details to assist the service center to properly respond. If the detected fault is not hard, an error message is displayed, at a step 422, to induce a user fix from the user or service technician. The base then waits for the user fix, at a step 424. Some examples of user fixes are: (1) replace the inker, (2) add toner, (3) clean printwheels, (4) set date, and others. Generally, the user fixes are dictated by the hardware design and can include anything that periodically needs attention.

If the base detects that the meter is fixed, at a step 426, the base proceeds to step 428. Otherwise, the base increments a user fix counter, at a step 430. If the base determines, at a step 432, that the user fix counter is less than the allowable maximum number, the base returns to step 422 to again display the error message. Otherwise, if the user fix counter equals the maximum, the base proceeds to step 440 where it places an automated service call.

Base Faults Detected by the Base

Figure 5:
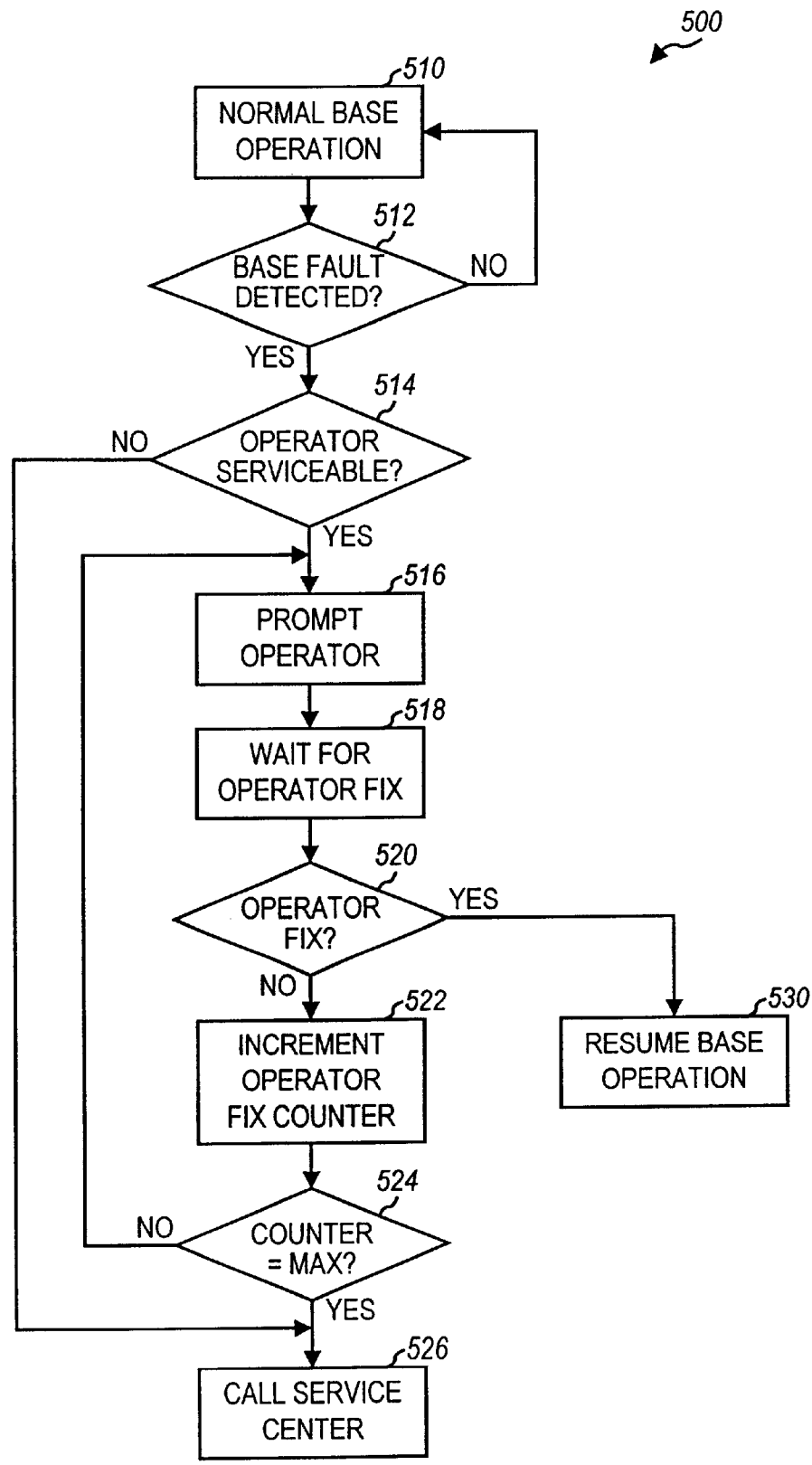
FIG. 5 is a flow diagram illustrating the detection and reporting of base faults by the base.

FIG. 5 shows a flow diagram 500 illustrating the operation of the diagnostic routine for detection and reporting of base faults by the base. At a step 510, the base operates in the normal manner. Periodically, at a step 512, the base determines whether a base fault has been detected. If no base faults are detected, the base returns to step 510 and resumes normal operation. Otherwise, if a base fault is detected, the base then determines whether the detected fault is operator serviceable, at a step 514. If the fault is not operator serviceable, the base proceeds to a step 526 where it places a service call using its modem. The base can report the fault code and the diagnostic details. Alternatively, if the detected fault is serviceable, the base prompts the operator, at a step 516, to perform service. The base then waits for the operator fix, at a step 518. The operator fixes can be those described above.

At a step 520, the base determines whether the operator fix clears the fault. If the answer is yes, the base proceeds to a step 530 where it resumes operation. Otherwise, the base proceeds to a step 522 where it increments an operator fix counter. At a step 524, if the base determines that the operator fix counter is less than the allowable maximum number, the base returns to step 516 to again prompt the operator. Otherwise, if the operator fix counter equals the maximum, the base proceeds to step 526 where it places an automated service call.

The flow diagrams shown in FIGS. 3–5 are one example of each of the three embodiments described herein. It will be obvious for those skilled in the art to modify the flow diagrams to match the particular design of the meter and base. Furthermore, the flow diagrams can be tailored to particular system goals and requirements.

The automated service call of the present invention allows for a robust design of the postage metering system. Traditionally, a fault related to a breach in security causes the meter to lock until a service call has been made. A design choice must be made a priori whether a particular fault state should cause the meter to lock up (causing downtime) or be allowed to operate (possibly compromising security).

With the automated service call, the postage metering system can be designed with varying levels of sensitivity in security and operability detection. The detection of one of a set of specified faults causes the meter and/or the base to report the fault to the service center. The service center can perform diagnostics using the reported diagnostic data. Furthermore, the service center can perform additional diagnostics of the meter and/or base through the modem link, to assess the severity of the condition. For example, the service center can shut down a meter experiencing a set of faults, each of which by itself may not be severe enough to justify the shut down. The service center can also take into account additional data known to it in assessing the fault. For example, the center may shut down a meter experiencing a soft fault, if that meter is past due for inspection or maintenance.

The automated service call of the present invention is especially suited for used in applications that require the reporting of meter failures. For example, the U.S. Postal system mandates that a postage meter failure be reported quickly after a failure detection. The automated service call by the meter and/or base can be automatically logged by the service center. The service center then uses the data to prepare the required report to the governing authority.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. For example, the flow diagrams can be modified to match the particular postage meter system design or goals. Thus, the present invention is not intended to be limited to the embodiments shown herein but is to be accorded the widest scope consistent with the principles and novel features disclosed herein.

What is claimed is:

1. A postage metering system for placing an automated service call to a service center comprising:
   a meter;
   a base coupled to the meter, the base including a processor; and
   a modem coupled to the base;
   wherein the processor runs diagnostic software configured to perform periodic checks of the base to detect security and base failures, the base sends a service call via the modem upon detection of particular ones of the detected failures.

2. The system of claim 1 wherein the failures are categorized into hard and soft faults.

3. The system of claim 1 wherein the modem is a wireless connection.

4. The system of claim 2 wherein the automatic service call is performed upon detection of hard faults.

5. The system of claim 2 wherein an operator fix is requested upon detection of soft faults.

6. The system of claim 2 wherein the meter performs automatic reset upon detection of soft faults.

7. The system of claim 6 wherein the meter resumes operation upon a successful automatic reset.

8. The system of claim 2 wherein the meter prompts for a manual reset upon detection of soft faults.

9. The system of claim 8 wherein the meter resumes operation upon a successful manual reset.

10. The system of claim 2 wherein the meter is disabled upon detection of hard faults.

* * * * *